United States Patent
Mendenhall et al.

(10) Patent No.: US 6,570,626 B1
(45) Date of Patent: May 27, 2003

(54) ON-SCREEN DISPLAY FORMAT REDUCES MEMORY BANDWIDTH FOR ON-SCREEN DISPLAY SYSTEMS

(75) Inventors: Todd C. Mendenhall, San Jose, CA (US); Katsuhiro Muromachi, Kawasaki Kamagawa (JP)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/105,669

(22) Filed: Jun. 26, 1998

(51) Int. Cl.[7] .......................... H04N 7/00; H04N 11/00
(52) U.S. Cl. .................. 348/569; 348/468; 348/474; 348/600; 345/600
(58) Field of Search ................... 348/461, 468, 348/563, 564, 569, 589, 600, 460, 467, 473, 474; 345/589–605, 690, 22, 550, 72, 83, 88; H04N 7/00, 11/00, 5/445, 5/50, 9/74, 9/76

(56) References Cited

U.S. PATENT DOCUMENTS

| | | | |
|---|---|---|---|
| 4,825,390 A | * 4/1989 | Van Aken et al. | 345/600 |
| 5,446,505 A | * 8/1995 | Chang Soo et al. | 348/738 |
| 5,486,872 A | * 1/1996 | Moon | 348/564 |
| 5,489,947 A | * 2/1996 | Cooper | 348/589 |
| 5,534,942 A | * 7/1996 | Beyers, Jr. et al. | 348/569 |
| 5,570,134 A | * 10/1996 | Hong | 348/467 |
| 5,579,057 A | * 11/1996 | Banker et al. | 348/589 |
| 5,659,366 A | * 8/1997 | Kerman | 348/460 |
| 5,757,414 A | * 5/1998 | Thorne | 348/1 |
| 5,973,740 A | * 10/1999 | Hrusecky | 348/401 |

FOREIGN PATENT DOCUMENTS

| EP | WO 9817056 | * 4/1998 |
|---|---|---|
| EP | WO 98/17066 | * 4/1998 |

* cited by examiner

Primary Examiner—John Miller
Assistant Examiner—Brian Yenke
(74) Attorney, Agent, or Firm—Conley, Rose & Tayon

(57) ABSTRACT

A video system is disclosed that processes OSD images and displays the OSD images on a display. At least some of the OSD images are represented by data sets that do not include a color palette. Each OSD data set includes a header comprising multiple bits of status and control information. One of the control bits indicates whether the OSD data set includes a color palette. Preferably that control bit is set to indicate no color palette in present and cleared to indicate the inclusion of a color palette in the OSD data set. By not including a color palette in an OSD data set, the corresponding OSD image can be represented with a smaller data set and can be transferred across a bus with a smaller bandwidth. If the control bit is set, indicating the absence of a color palette in the OSD data set, a color palette included in another OSD data set is used instead to draw the desired OSD image.

19 Claims, 10 Drawing Sheets

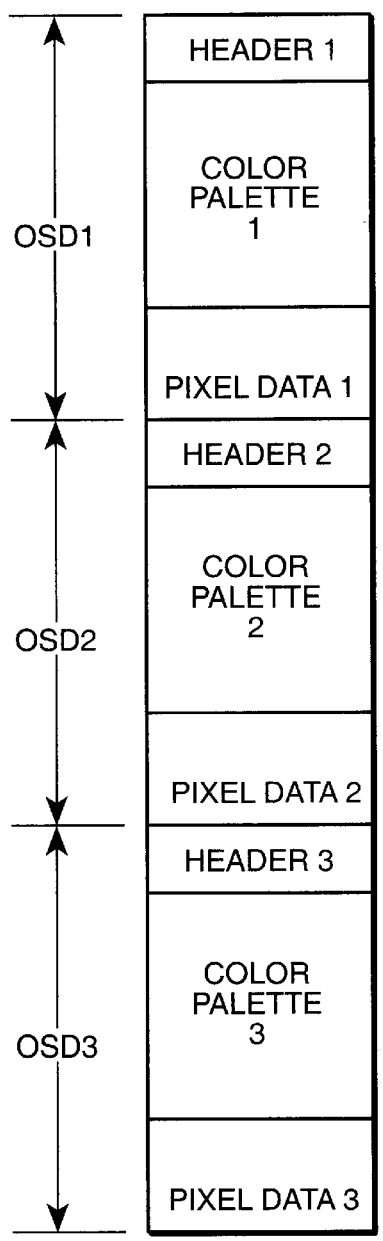
FIG._1
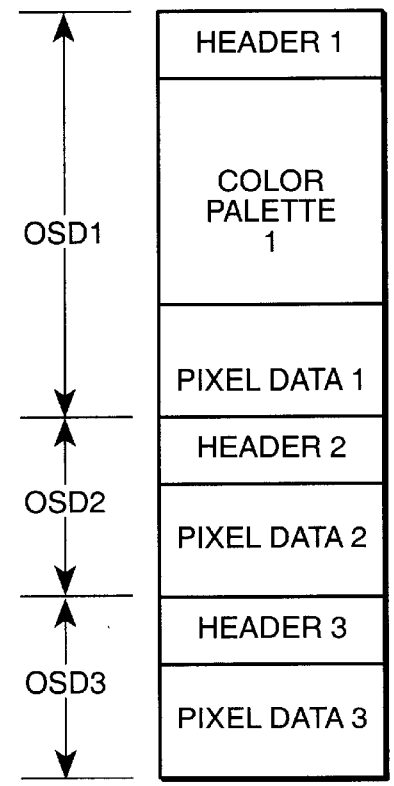
FIG._12

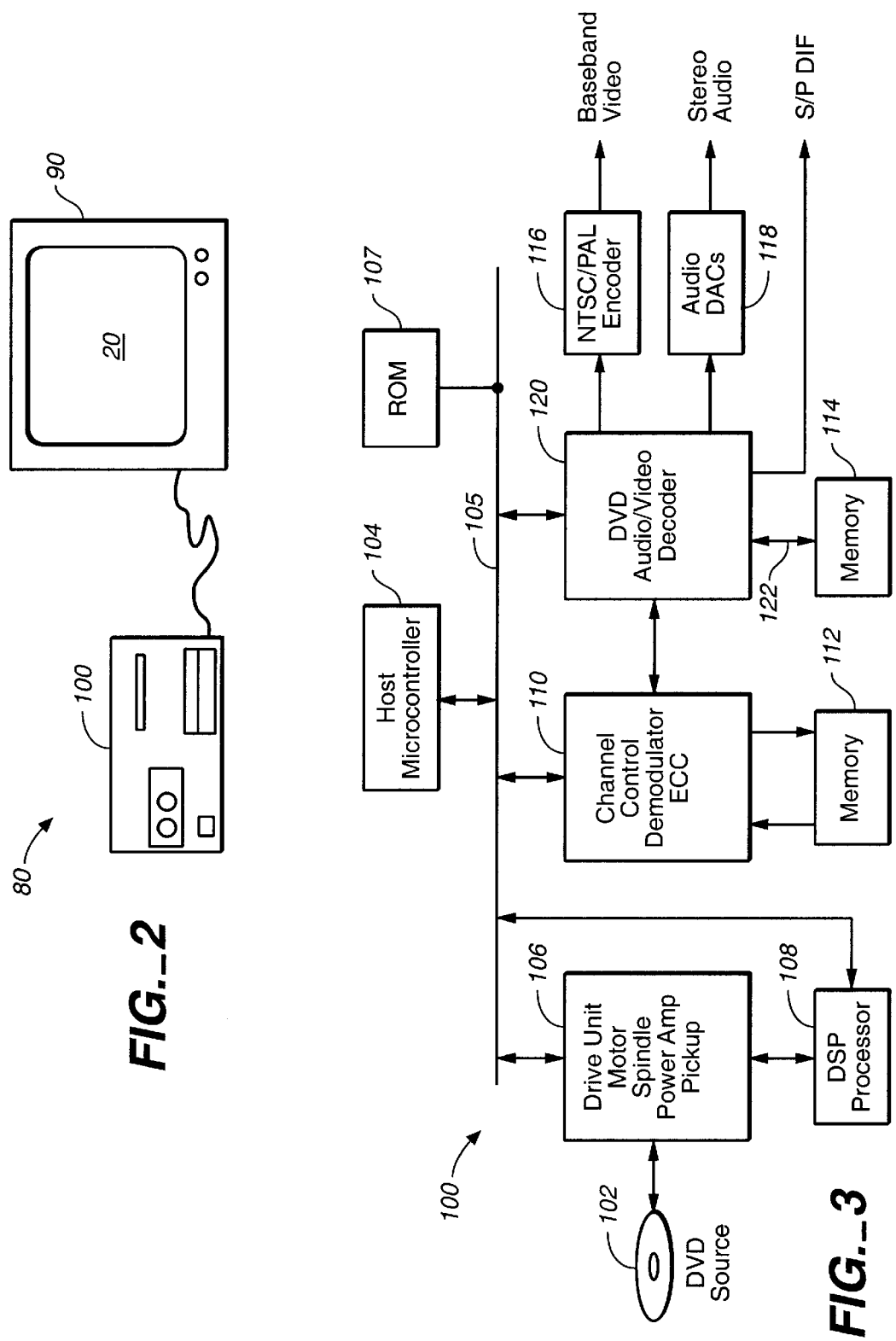

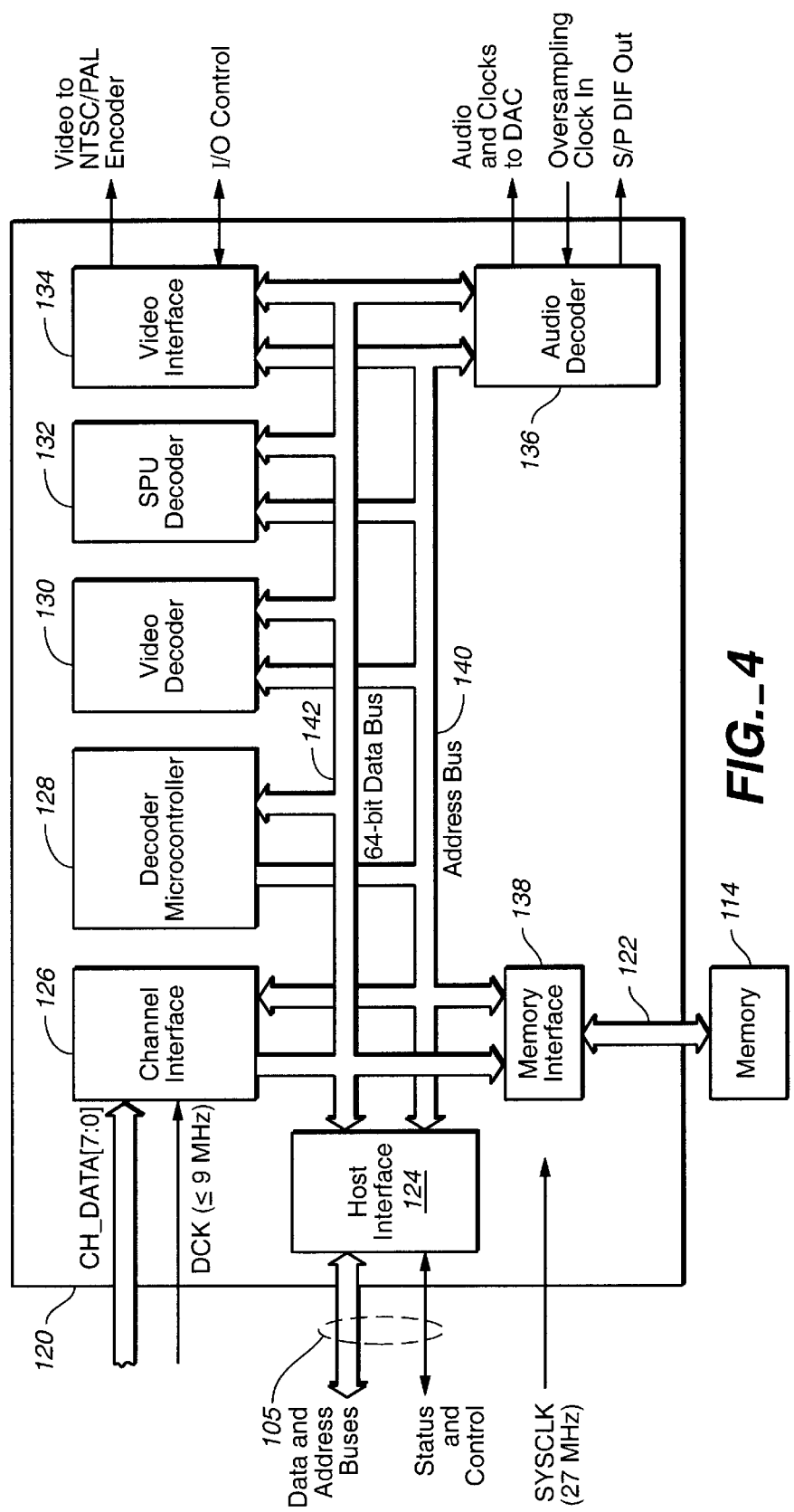
FIG._4

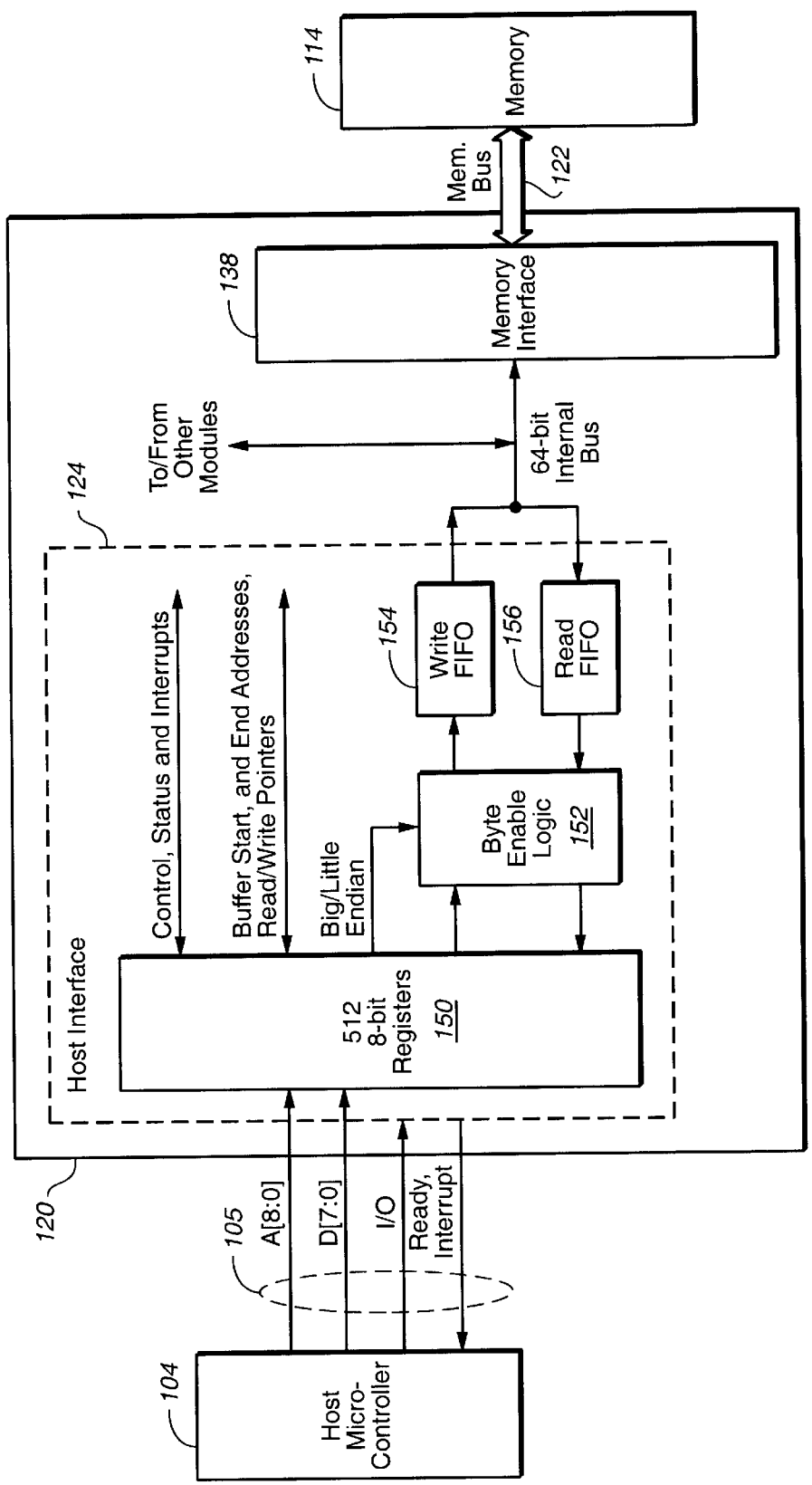
FIG._5

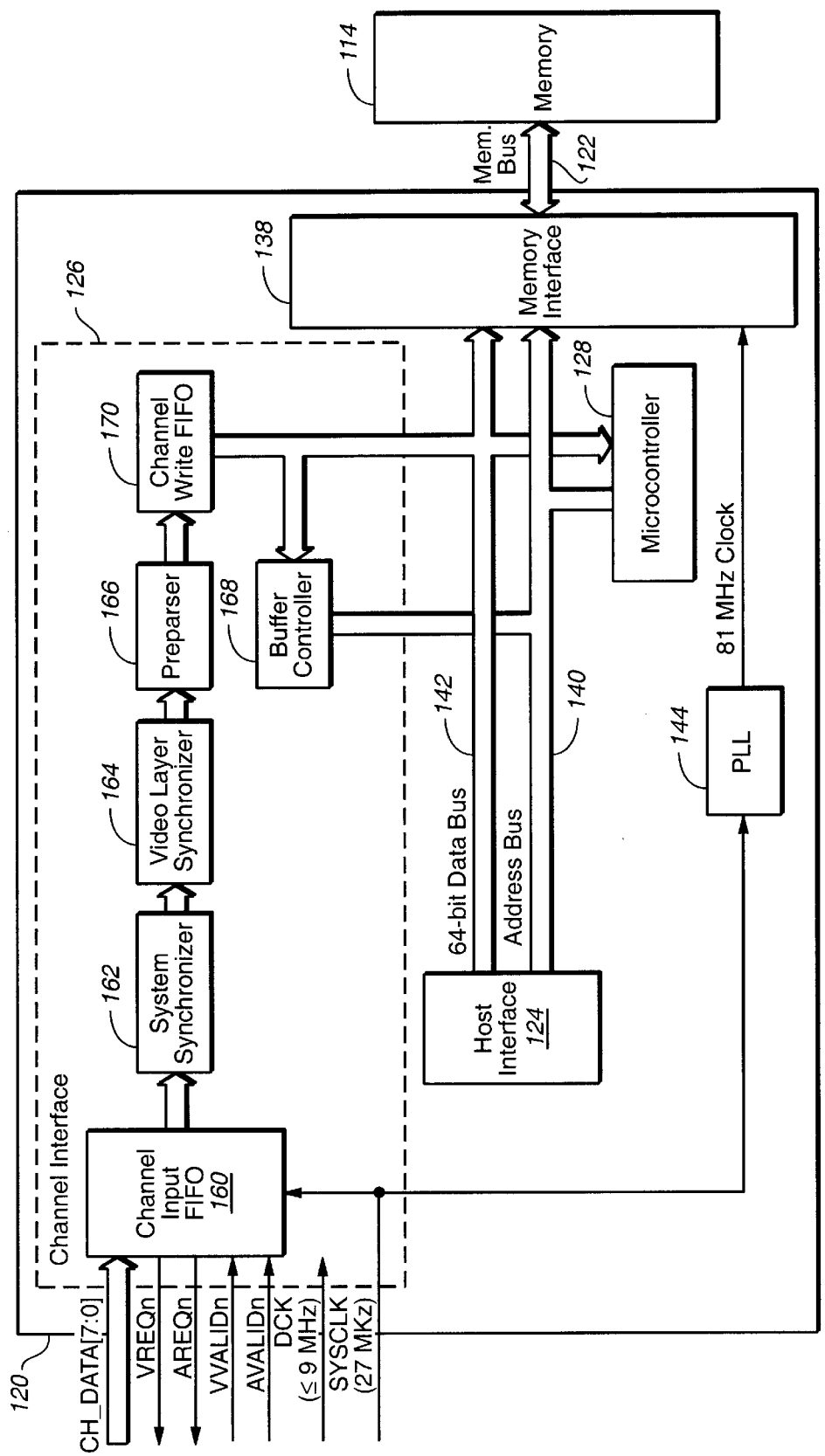
FIG._6

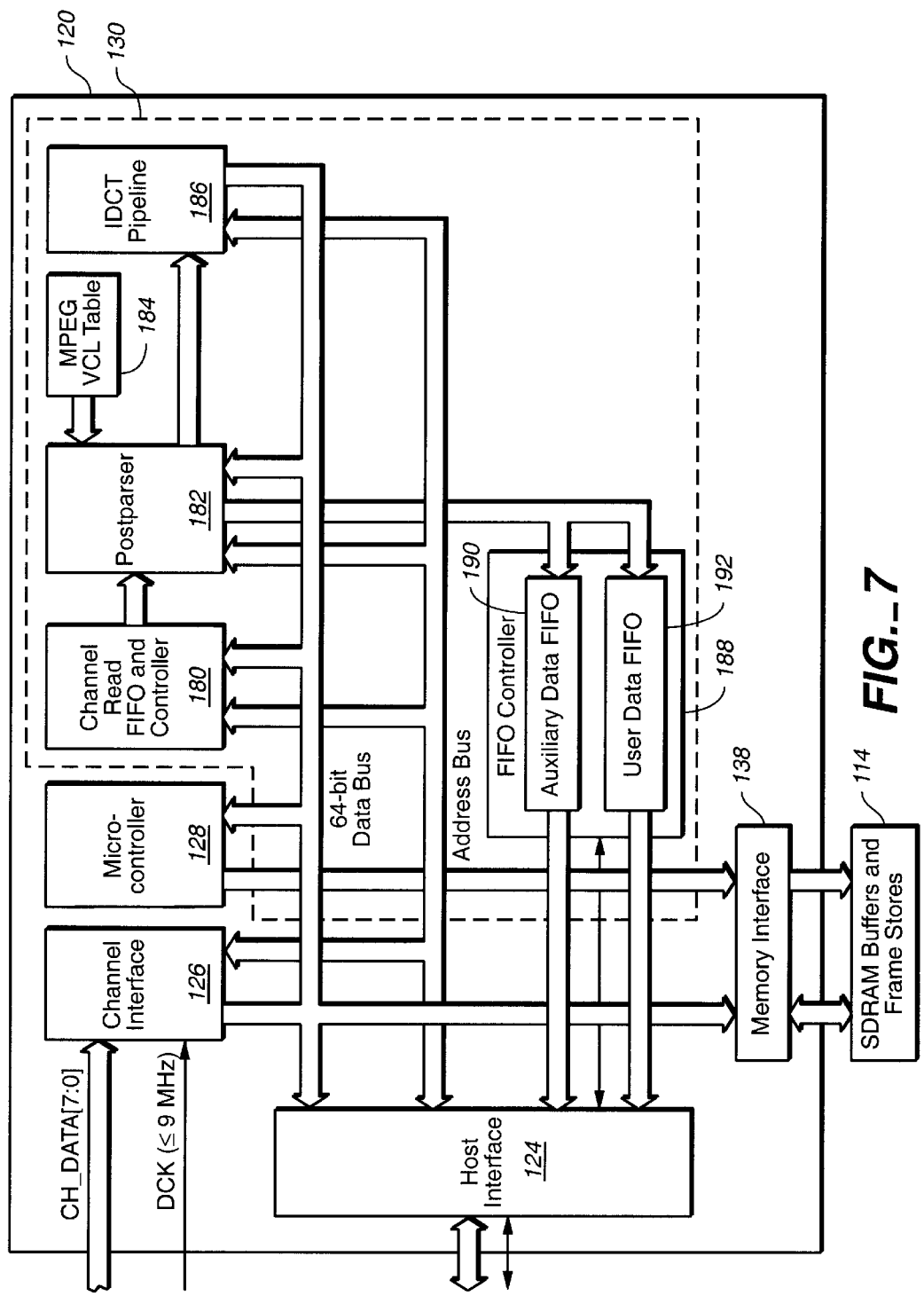
FIG._7

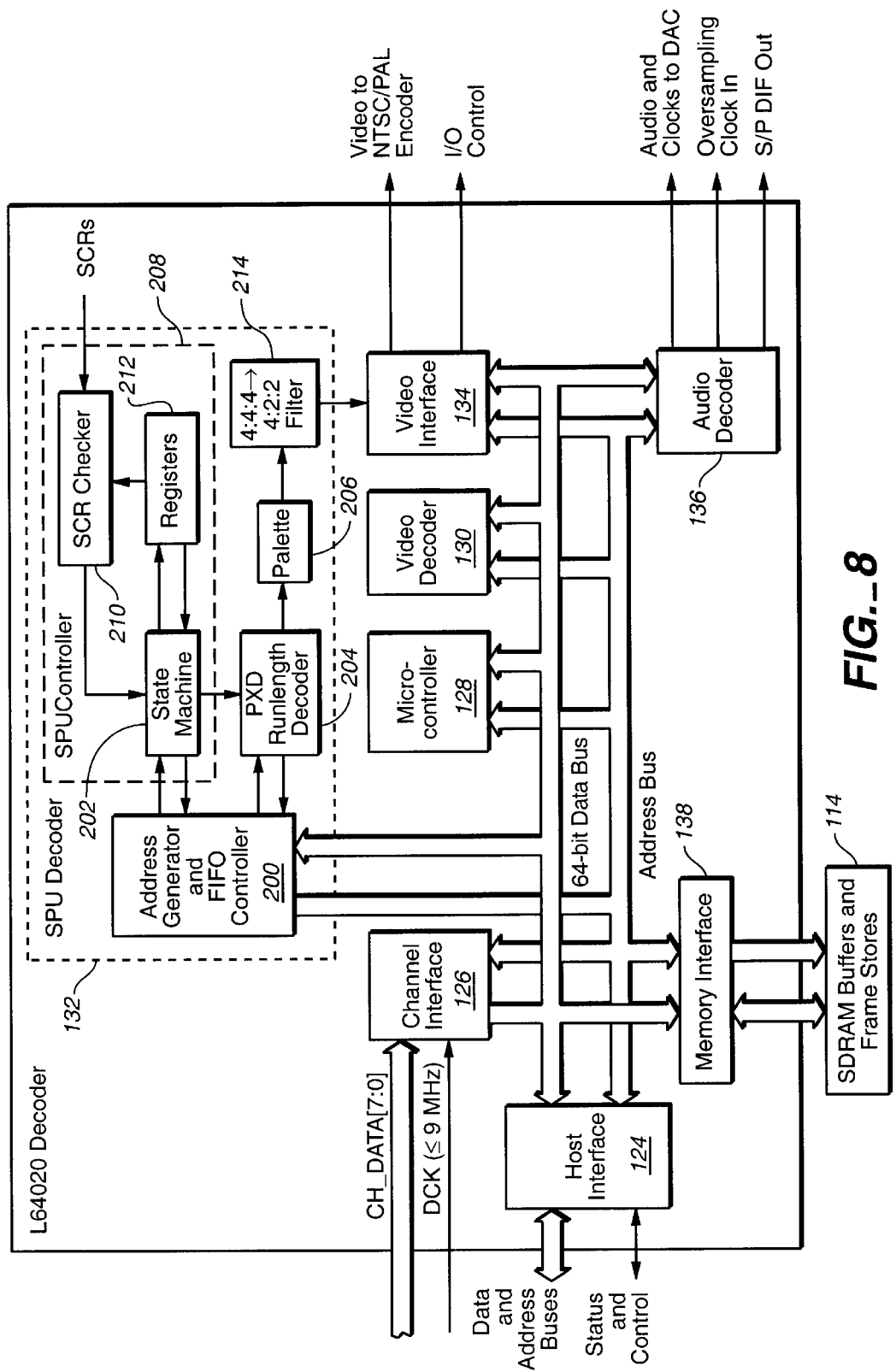
FIG._8

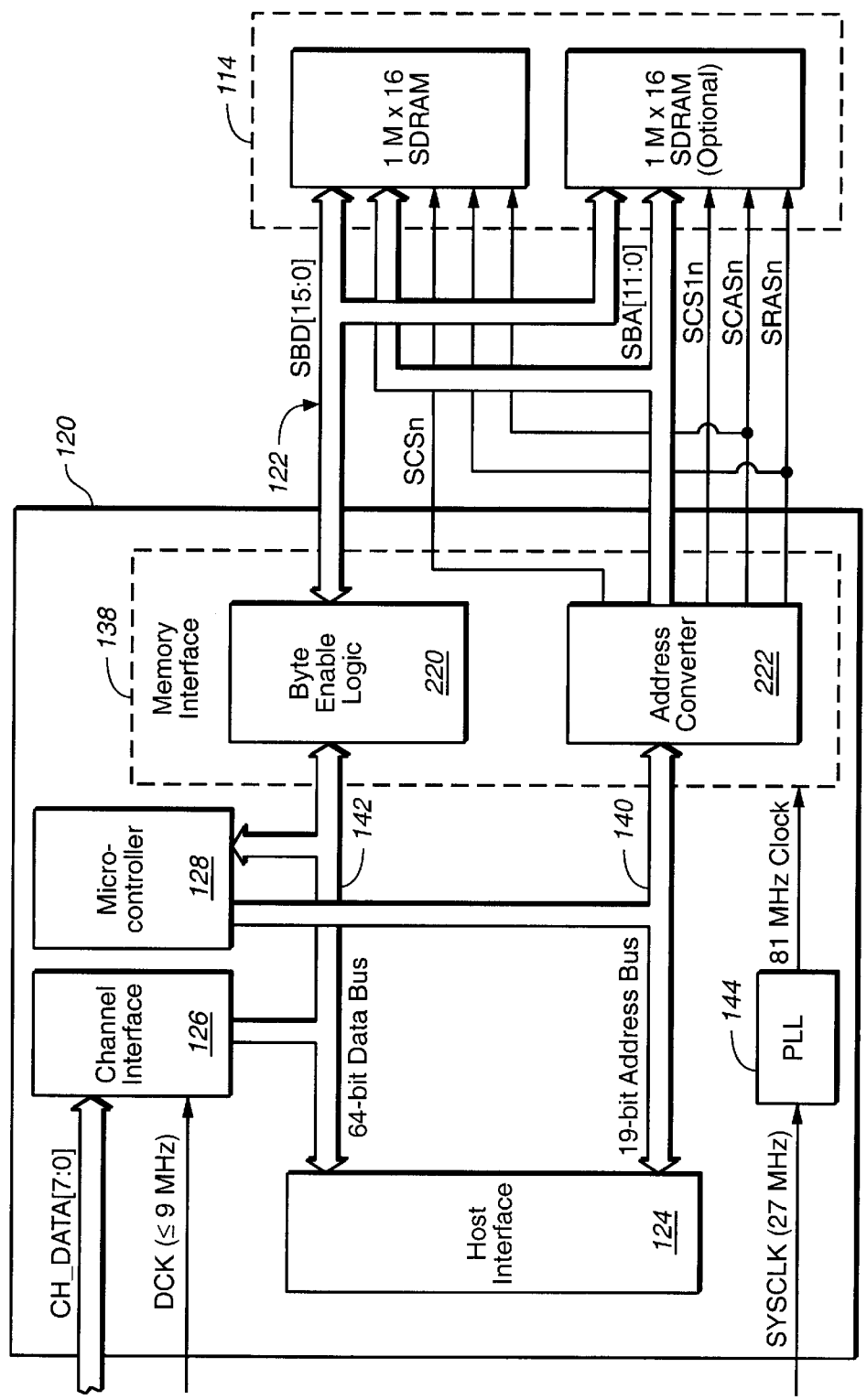
FIG._9

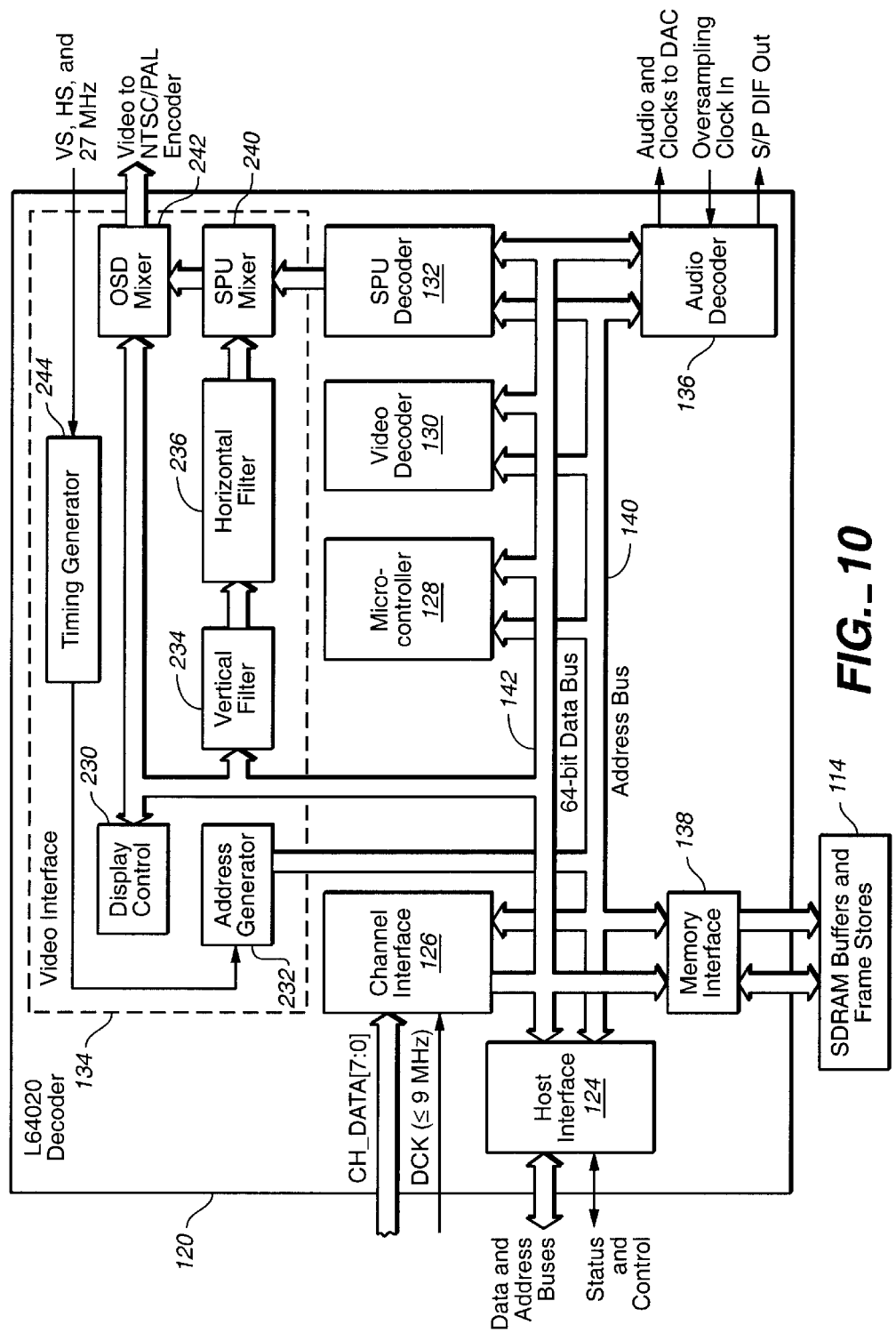
FIG._10

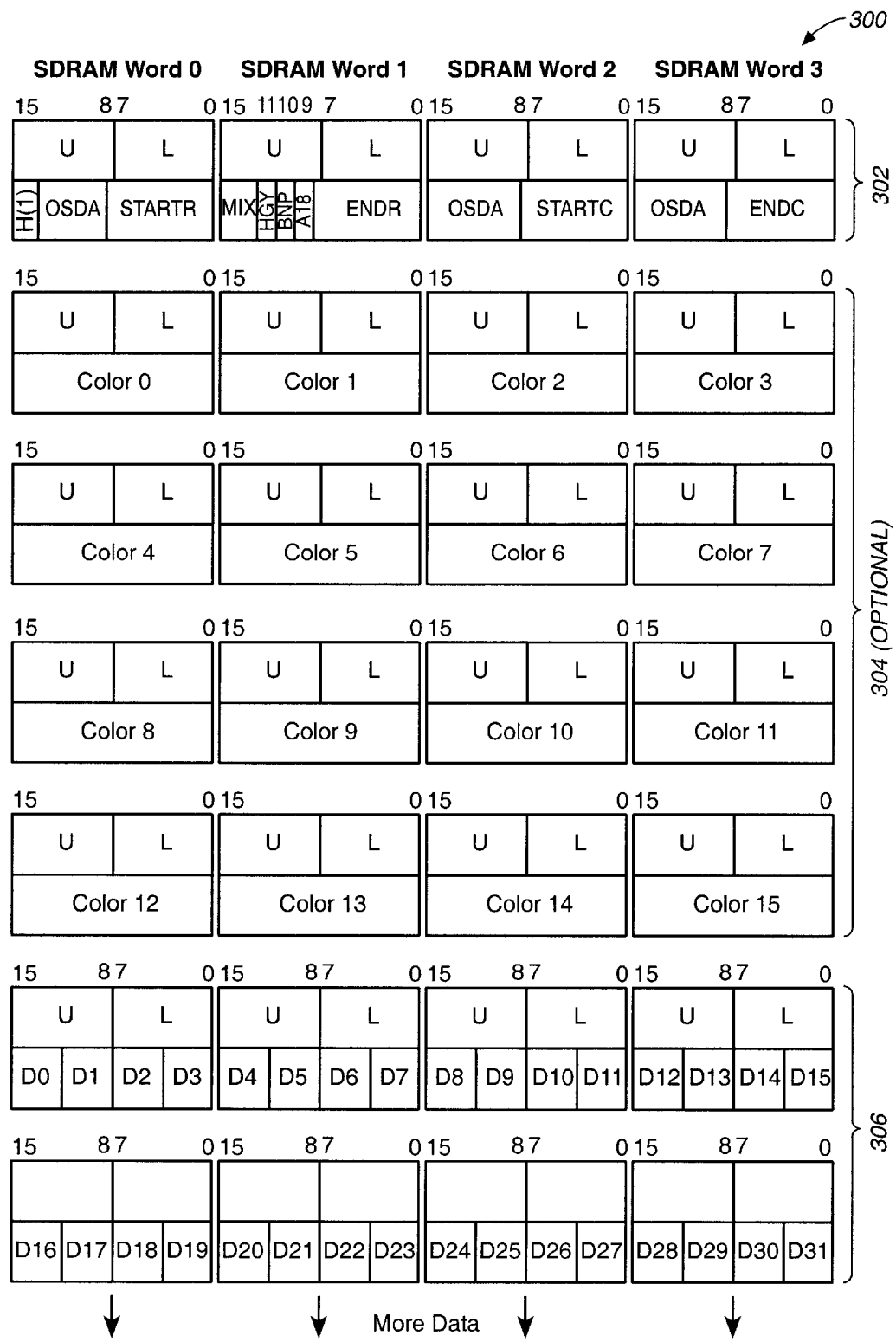
FIG._11

ON-SCREEN DISPLAY FORMAT REDUCES MEMORY BANDWIDTH FOR ON-SCREEN DISPLAY SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to video display systems. More particularly, the present invention relates to on-screen display images generated by video display systems. More particularly still, the invention relates to an improved data format for on-screen displays to reduce bandwidth in a video system.

2. Background of the Invention

The consumer electronics industry has experienced a dramatic explosion in product development over the last 20 years. This explosion has been fueled by consumer demand coupled with significant advances in semiconductor technology that have lead to lower cost semiconductor devices incorporating significantly more functionality than previously possible. For example, a hand-held calculator from 20 years ago provided the ability to perform rudimentary mathematical operations. Today, a hand-held device can provide much of the functionality of a desktop computer system.

Significant advances have also been made with respect to video equipment, such as televisions, videocassette recorders (VCR's), and the video and graphics subsystems in personal computers. This sophistication of these types of equipment has increased to a level where it has been necessary for the equipment manufacturers to devise new types of user interfaces to insure that the equipment remains easy to use. Rather than providing buttons, switches, and knobs on the front panel of such equipment, the manufacturers instead often design the equipment to be operated by "on-screen displays" (OSD's). An OSD is a window that "pops up" on the television or computer display and provides a control interface for the user. For example, many VCR's are programmed by pressing a "menu" button on the remote control. In response, an OSD pops up on the television screen and provides menu choices to permit the user to program the VCR. The user then can use the remote control to scroll through the various OSD menu choices and select the desired choices for programming the VCR. OSD's are also used in conjunction with digital video disk (DVD) players, personal computers, and other types of equipment.

An OSD represents an image that is drawn on a television or computer screen. Such screens typically are comprised of a plurality of rows and columns of "pixels." A typical television screen comprises a grid of pixels in accordance with one of at least two industry standard formats. In the NTSC standard, each frame of video includes 720 columns of pixels with each column including 480 pixels (720×480). The PAL standard includes a pixel grid of 720×576 pixels. Computer screens typically have a higher resolution. A full screen OSD is typically divided into several regions transparent to the user. An OSD image typically covers only a portion of the screen and thus includes less than the total number of pixels available on the screen.

Recently, digital video disk (DVD) systems and have become available as an alternative to VCR's. A digital video disk resembles a CD-ROM disk and can store an entire movie including both video and audio information as well as other information. DVD systems can be connected to a television or incorporated into a computer system. The present invention relates to an improved format for representing OSD images. The principles of the invention are applicable with respect to any video equipment that generates OSD's. For simplicity in explaining the preferred embodiments of the invention, however, this disclosure focuses on OSD images in the context of DVD systems.

A DVD system typically includes a microcontroller for controlling the drive, memory for storing video data and other information, a decoder for decoding video, audio data stored in a predefined coded format such as in Moving Pictures Experts Group (MPEG), and other components. The OSD information is stored in memory generally according to the format shown in FIG. 1 which illustrates OSD information for three different on-screen displays—OSD 1, OSD 2, and OSD 3. Each OSD data set itself comprises three types of data. The header data includes information regarding the location of the associated OSD image on the television or computer screen, as well as other needed information for drawing the OSD image. The color palette includes digital representations of one or more colors that can be used to draw each pixel in the OSD image. The pixel data includes a value associated with each OSD pixel that specifies which color from the color palette is to be applied by the audio and video decoder to that pixel. Thus, in conventional video systems every OSD data set includes a header, a color palette and pixel data Each OSD data set requires a finite amount of memory for storage. As more colors are added to the color palette, the color palette requires more memory for storing the additional colors. Similarly, as the size of the OSD image itself becomes larger and thus encompasses more screen pixels, the amount of pixel data increases thus requiring more memory for storage. For the video decoder to display an OSD image on the display, the desired OSD data set must be transferred from memory where it is stored to the decoder. The transfer of an OSD data set from memory to the decoder takes a finite amount of time which disadvantageously increases for larger OSD data sets. Further, images on a computer or television monitor are re-drawn many times each second (generally 30 times per second). The rate at which the screen is re-drawn is sufficiently fast to be imperceptible to the human eye. Thus, the image looks constant (i.e., does not flicker) on the screen. Because the OSD may change at any point in time (e.g., removed from the screen altogether or changed based on input from the user), it is generally necessary to re-copy the entire OSD data set from memory to the video decoder every time the screen is re-drawn. Re-copying the entire OSD data set is also required because most video decoders do not include enough internal memory to store all of the OSD data sets at one time.

The memory in which OSD information is stored is also shared by other components in the DVD system. For example, the memory is also used to store information relevant to the decoding and display processes as well as general configuration information. Thus, a "bottleneck" may occur as multiple devices compete for access to memory. Generally, data is transferred from one device in an electronic system to another device across a collection of digital signal lines collectively referred to as a "bus." Typically, a single bus may interconnect numerous electronic components. Most bus communication protocols only permit one transaction (e.g., data transfer) to run at a time on the bus. Other components connected to the bus also desiring to use the bus to execute a transaction must wait until the prior data transaction completes.

The maximum rate at which data can be transferred across a bus (generally referred to as the "bandwidth" of the bus) is determined by the particular types of components connected to the bus as well as the communication protocol implemented by the bus. Because the complete OSD data set must be transferred from memory to the audio and video decoder across a bus many times each second and other components in the DVD system may also need access to the bus, it may be difficult for the video system to timely accomplish all that is required given the bandwidth limitation of the bus.

One solution to this problem might be to develop electronic components that operate at faster speeds than previously possible. As such, the bandwidth of the bus used transfer the OSD data could be increased. Although this approach should not be neglected, it is generally a costly approach that requires significant development and testing time and resources. Accordingly, it would be desirable to be able to transfer OSD data across a bus in less time than previously possible given an existing data bus transfer rate.

BRIEF SUMMARY OF THE INVENTION

The deficiencies noted above are solved in large part by a video system that processes OSD data sets, at least some of which do not include a color palette. In accordance with the preferred embodiment, each OSD data set includes a header comprising multiple bits of status and control information. One of the control bits is a BITMAP ONLY (BMP ONLY) bit that indicates whether the OSD data set includes a color palette. Preferably the BMP ONLY bit is set to indicate no color palette in present and cleared to indicate the inclusion of a palette in the corresponding OSD data set. By not including a color palette in an OSD data set, the OSD image can be represented with a smaller data set, and the bus bandwidth problem is alleviated.

In one embodiment of the invention if the BMP ONLY bit is set, indicating the absence of a color palette in the corresponding OSD data set, a color palette included in another OSD data set is used instead to draw the desired OSD image. Accordingly, bit map data from one OSD data set specifies which colors are to be used from a color palette in another OSD data set. This embodiment is particularly beneficial when multiple OSD's are to be displayed all using the same colors. Alternatively, a default color palette can be used if desired.

The video system implementing the invention preferably represents the processing circuitry in a digital video disk (DVD) drive, although the invention can be implemented in other types of video equipment as well. The video system preferably includes an audio/video decoder connected to memory and other devices. The audio/video decoder includes a microcontroller coupled to various functional units including a memory interface, a video decoder and a video interface over a bus.

OSD data sets and MPEG encoded video data stored in memory are transferred through the memory interface into the audio/video decoder. The video decoder decodes the encoded data and filters included in the video interface further process the decoded video data. The video interface also includes an OSD mixer that mixes OSD data with the processed video data. The OSD mixer examines the BMP ONLY bit, preferably included in a header portion of each OSD data set, and if the BMP ONLY bit is configured to indicate the absence of a color palette in the data set, the OSD mixer uses a color palette from another data set or uses a default color palette.

The invention permits OSD images to be represented with fewer bytes than previously possible, thus alleviating the bandwidth problem of data transfers on a bus in a video system. These and other benefits and advantages will become apparent after reading the following disclosure in conjunction with the drawings.

BRIEF DESCRIPTION OF THE DRAWINGS

A better understanding of the present invention can be obtained when the following detailed description of the preferred embodiment is considered in conjunction with the following drawings in which:

FIG. 1 shows a prior art format for representing OSD images;

FIG. 2 shows a DVD system connected to a display;

FIG. 3 is a block diagram of the DVD system of FIG. 2 constructed in accordance with the preferred embodiment;

FIG. 4 shows a block diagram of a preferred embodiment of an audio/video decoder included in the DVD system of FIG. 3;

FIG. 5 is a block diagram of a host interface included in the audio/video decoder of FIG. 4;

FIG. 6 is a block diagram of a channel interface included in the audio/video decoder of FIG. 4;

FIG. 7 is a block diagram of a video decoder included in the audio/video decoder of FIG. 4;

FIG. 8 is a block diagram of an SPU decoder included in the audio/video decoder of FIG. 4;

FIG. 9 is a block diagram of a memory interface included in the audio/video decoder of FIG. 4;

FIG. 10 is a block diagram of a video interface included in the audio/video decoder of FIG. 4;

FIG. 11 illustrates the data format of the preferred embodiment for representing an image; and FIG. 12 illustrates how the preferred format for representing OSD data sets permits multiple data sets to be represented with fewer bytes of data than prior art formats such as that shown in FIG. 1.

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Referring now to FIG. 2, video system 80 constructed in accordance with the preferred embodiment generally includes a display device 90 coupled to a video player 100.

Video player 100 will be described throughout this disclosure as a digital video disk (DVD) system. The principles of the present invention, however, can be applied to other types of video equipment such as videocassette recorders and laser disc players, to name a few. Moreover, the invention can be adapted to any type of video equipment that uses "on-screen displays" (OSD). Display device 90 preferably is a television set or other type of monitor. Further, DVD drive 100 could be incorporated into a personal computer system and thus could be coupled to a computer display.

Referring now to FIG. 3, DVD system 100 preferably includes a host microcontroller 104, a drive unit motor/spindle power amplifier/pickup 106, read only memory (ROM) 107, a DSP processor 108, a channel controller demodulator/ECC 110, memory 112, memory 114, NTSC/PAL encoder 116, audio digital-to-analog converters 118, and a DVD audio/video decoder 120. Alternatively, the audio and video processing functions of audio/video decoder 120 can be implemented with separate devices. Thus, audio/video decoder 120 can be replaced with a video processor, and an audio processor could be included as part of DVD drive 100 as a separate component.

The host microcontroller 104 couples to the drive unit motor spindle power amplifier pickup 106, DSP processor 108, channel control demodulator ECC 110, and DVD audio/video decoder 120 via a bus 105. The bus is implemented with any suitable protocol commonly available or custom designed. In accordance with the preferred embodiment, DVD system 100 is capable of receiving and processing MPEG video and audio data. The DVD system can implement either the MPEG-1 or MPEG-2 compression techniques. Alternately, DVD system 100 can be adapted to process data compressed according to other techniques besides MPEG if desired.

A DVD disk 102 can be inserted into DVD system 100. The DVD audio/video decoder 120 generally receives demodulated, coded audio and video data from the DVD disk 102 through the channel control demodulator/ECC 110 and produces a decoded audio and video output data stream to the NTSC/PAL decoder 116 (for video) and audio digital-to-analog converters 118 (for audio). The DVD audio/video decoder 120 also provides a Sony/Philips digital interface (S/P DIF) formatted output stream which is a format commonly known to those of ordinary skill.

The host microcontroller 104 preferably can be any general purpose microcontroller such as those made by Intel or Motorola. The host microcontroller 104 generally controls the operation of the DVD system. The microcontroller 104 executes an initialization routine to test the system's components during power up and responds to functions selected by the user through input controls (not shown).

The memory 114 preferably is implemented as synchronous dynamic random access memory (SDRAM), although other types of memory devices can be used as well, such as conventional DRAM and extended data out DRAM (EDO DRAM). In accordance with the preferred embodiment, memory 114 comprises a SDRAM device with a 16 Mbit capacity and an 81 MHz clock speed capability. Examples of suitable SDRAM devices include the KM416S1120A manufactured by Samsung or the upD4516161 manufactured by NEC. Further, and if desired, memory 114 may be implemented as two or more SDRAM modules. Thus, if two 16 Mbit SDRAM devices are used, the total memory capacity of memory 114 is 32 Mbits.

The ROM 107 preferably is used to store on-screen display data as well as other configuration information and code. During system initialization, the host microcontroller 104 transfers a copy of the OSD data sets from ROM 107 across bus 105 through the DVD audio/video decoder 120 and into memory 114. The DVD audio/video decoder 120 receives video data from the channel control demodulator/ECC 110 and OSD data from memory 114. The DVD audio/video decoder 120 then mixes the OSD data with the video signals and provides a video output signal to the NTSC/PAL encoder 116.

Drive unit motor motor/spindle power amplifier/pickup 106 generally includes motors to spin the DVD disk 102 and includes read heads to read data from the disk 102. Drive unit motor 106 may also include write heads for writing data to disk 102. Any suitable type of drive unit motor motor/spindle power amplifier/pickup can be used.

The DSP processor 108 provides filtering operations for write and read signals, and acts a controller for the read/write components of the system (not specifically shown). The DSP controller 108 controls the drive motors included in the drive unit motor motor/spindle power amplifier/pickup 106. The DSP processor 108 may be implemented as any suitable DSP processor.

The channel controller demodulator/ECC 110 preferably decodes and buffers the read data from the DVD disk 102 in order to control the rate of the video and audio bitstreams. The channel controller demodulator/ECC 110 also includes an error correction code (ECC) decoder to decode the demodulated signal. Any suitable channel control demodulator/ECC can be used.

The NTSC/PAL encoder 116 receives processed digital video data from audio/video decoder 120 and generally converts the received video bitstream to a predefined analog format. The encoder 116 typically comprises an NTSC/PAL rasterizer for television, but may also be a digital-to-analog converter for other types of video formats. The audio digital to analog converts 118 receive a digital representation of the audio signal from the audio/video decoder 120 and, according to known techniques, converts the signal into an analog audio signal that can be played through a speaker.

Each OSD data set represents the information needed to display an OSD image on the monitor 90. Each data set preferably includes a header portion and pixel data as shown in FIG. 1. In accordance with the preferred embodiment, however, not every OSD image is represented by a data set that includes a color palette—some data sets only have a header and pixel data. FIG. 12, for example, shows the three OSD data sets of FIG. 1 reformatted in accordance with the preferred embodiment. Only OSD data set 1 includes a color palette. The data sets for OSD 2 and OSD 3 do not include color palettes. Rather, in accordance with the preferred embodiment, OSD 2 and OSD 3 use the color palette of OSD 1. By eliminating one or more of the color palettes required for the various OSD displays, the preferred embodiment of the invention enables the OSD images to be represented with smaller data sets than in conventional DVD systems. Moreover, by eliminating color palettes from one or more OSD display, the bandwidth problem for transferring OSD data through the video system is alleviated. The following discussion in conjunction with FIGS. 4–12 explains in greater detail the preferred embodiments of the invention, how the audio/video decoder 120 determines whether an OSD data set includes a color palette or not, and which color palette is to be used when an OSD data set does not include its own color palette.

Referring now to FIG. 4, the audio/video decoder 120 preferably includes a host interface 124, a channel interface 126, a decoder microcontroller 128, a video decoder 130, a sub-picture unit (SPU) decoder 132, a video interface 134, an audio decoder 136, and a memory interface 138. As shown, these components are coupled together via a 64-bit data bus 142 and an associated address bus 140. The interface to the channel control demodulator ECC 110 is provided by the channel interface 126. The interface to bus 105, and thus host microcontroller 104 is provided by host interface 124. The memory interface 138 provides the interface for the decoder 120 to memory 114. The video interface 134 generates video data to be provided to NTSC/PAL encoder 116 and the audio decoder 136 generates the output digital audio data to be provided to digital-to-analog converters 118. Audio decoder 136 also generates the S/P DIF audio output stream. The following discussion describes functional units depicted in FIG. 4 relevant to the preferred embodiment in-greater detail.

Referring now to FIG. 5, the host interface 124 preferably includes 512, 8-bit registers 150, byte enable logic 152, a write FIFO 154, and a read FIFO 156. The host microcontroller 104 communicates with the audio/video decoder 120 preferably through the use of registers 150 in the host interface 124, although other communication techniques can be implemented as well. As such, the host microcontroller 104 writes video, audio, and configuration data and other status information to predefined registers in the 512 block of registers 150. The decoder 120 continuously or periodically monitors registers 150 for updated information and responds accordingly. Similarly, decoder 120 communicates information to the host microcontroller 104 through the use of register 150.

An external interrupt signal from the audio/video decoder 120 alerts the host microcontroller 104 about internal events, such as picture or start code detection. Separate input/output (I/O) signals are used for hand-shaking using techniques commonly known to those of ordinary skill. The host interface supports direct read or write cycles, DMA transfers using an external DMA controller, (not shown) and block data moves within memory 114.

The host interface 124 connects to a 9-bit input address bus (A[8:0]) to provide addressing for all 512 registers 150 and an 8-bit, bi-directional data bus (D[7:0]) both of which are part of bus 105. The registers 150 contain status bits and fields, control bits and fields, memory buffer pointers for bit stream header fields and data, system clock reference (SCR) capture and compare values and control bits, and host-to-memory access addresses and data.

The host microcontroller 104 can perform read and write operations to memory 114 through the host interface 124 and memory interface 138. The host interface 124 temporarily stores write data in write FIFO 154 before passing the data to memory 114. Data retrieved from memory 114 in response to a read cycle initiated by the host microcontroller 104 is temporarily stored in read FIFO 156 before being transferred to read registers (not specifically shown) in register block 150.

The byte enable logic 152 places the read and write data in the desired order depending on how the host microcontroller 104 operates. The audio/video decoder 120 is configurable to operate with a host microcontroller that operates in either big "endian" order or little "endian" order. Big or little endian order refers to the order of bytes in a 64-bit (i.e., 8 byte) data transfer. Big endian order refers bytes 0–7 residing in bits 63:0, respectively (i.e., byte 0 residing in bits [63:56] and byte 7 bits [7:0]. Little "endian" order refers to byte 7 represented by bits [63:56] and byte 0 represented by bits [7:0]. The host microcontroller 104 preferably can set a bit in registers 150 to indicate whether the host microcontroller implements big or little endian order. Accordingly, a big/little endian order signal is received by byte enable logic 152 from register set 150. In response to this signal, the byte enable logic 152 orders the data according to the requirements of the host microcontroller 104.

Referring now to FIG. 6, the channel interface 126 preferably includes a channel input FIFO 160, a system synchronizer 162, a video layer synchronizer 164, a preparser 166, a buffer controller 168, and a channel write FIFO 170. The channel interface 126 accepts byte-wide MPEG data streams from the channel control demodulator ECC 110 (FIG. 3) over the CH_DATA [7:0] bus. The channel interface 126 asserts video and audio transfer request signals, VREQn and AREQn, to indicate to the channel control demodulator ECC 110 that the channel interface 126 is ready to receive a new byte of encoded video or audio data. When the channel device 110 places the requested data on the CH_DATA bus, the channel device 110 asserts an audio or video valid signal, AVALIDn or VVALIDn depending on whether the data to be transferred represents audio or video. The VALIDn signals indicate that the requested data is available to the channel interface 126.

If desired, a DCK clock input signal may be provided to the channel interface 126. If implemented, the DCK signal preferably has a frequency of less than or equal to 9 MHz, although frequencies greater than 9 MHz can also be used. The DCK clock signal preferably is generated by the external channel device 110. The DCK clock signal, in conjunction with the AVALIDn and VVALIDn signals, is used to write data synchronously to the channel input FIFO 160. When the DCK clock input signal is connected to channel interface 126, the channel interface 126 uses the clock to synchronize the input valid signals before strobing the data into the channel input FIFO 160. This method for inputting data into the channel input FIFO 160 is recommended for connecting external channel devices 110 that do not have clean AVALIDn and VVALIDn signals.

Alternatively, the channel interface 126 can be configured for receiving audio and video data asynchronously. In the asynchronous mode, the DCK clock input pin preferably is tied to ground and the channel data are bytes are placed into the channel input FIFO 160 upon the assertion of the REQn and VALIDn control signals. As such, the data is not latched into the channel input FIFO synchronously with the DCK clock signal.

Referring still to FIG. 6, the preparser 166 strips the packets of headers from the MPEG data and writes the header and packet data payloads into separate buffer areas in a memory 114. The host microcontroller 104 writes the start and end addresses of each of the buffer areas into registers (not specifically shown) in the preparser. The internal decoder microcontroller 128 transfers these addresses to the buffer controller 168. The buffer controller 168 maintains current read and write pointers for each buffer area defined in memory 114. When the preparser 166 strips an item out of the bit stream, the decoder microcontroller 128 retrieves the current write pointer to the buffer area for that item and writes the item into the buffer. The microcontroller 128 also writes the least significant bit of the item's address pointer to the appropriate register. If the host microcontroller 104 reads the least significant bit, the buffer controller 168 writes the next pointer address byte and the most significant byte to the register.

Referring now to FIG. 7, the video decoder preferably includes a channel read FIFO and controller 180, postparser 182, MPEG variable length code (VLC) table 184, IDCT pipeline 186, and FIFO controller 188. The FIFO controller 188 preferably includes an auxiliary FIFO buffer 190 and a user data FIFO 192. Generally, the video decoder 130 reads MPEG video data from memory 114, performs post-parsing on the data, decompresses and decodes the data and stores the processed data back in memory 114 in video frame form. The post-parsing process strips off all header information and stores the header information in memory (not shown) for use in the decoding process.

The various parameters and the compressed video bitstream are VLC encoded. During VLC decoding, the pattern appearing in the bitstream is matched against a group of patterns from a lookup table 184. If none of the patterns in the lookup table 184 match the pattern in the bitstream, a VLC coding error results.

The channel interface 126 parses pack, system and packet headers from the MPEG bitstream and stores video packet payloads in memory 114. The preparsed video data is read from the memory 114 into the channel read FIFO and controller 180.

The postparser 182 along with the microcontroller 128 strips the bitstream apart, and passes the appropriate bits and fields in the stream to the microcontroller 128 for use in picture decoding, to the auxiliary data FIFO 190 to user data FIFO 192 for processing by the host, and to the IDCT pipeline 186 for picture data decoding and reconstruction. The postparser 182 decodes layers of syntax in the MPEG bitstream starting from the sequence layer and going through all of the lower layers including the group of pictures layer, picture layer, slice layer, macro block layer and block layer, all of which are known to those of ordinary skill in the art.

The IDTC pipeline 186 decodes the block layer bytes per instructions from the microcontroller 128 decoded from the bitstream. The results are placed in the frame stores of memory 114 as picture bitmaps. The video interface 134 reads the picture data from memory 114, mixes it with SPU and OSD video and sends the mixed data to the external NTSC/PAL Encoder.

The auxiliary data FIFO 190 is used to store certain parameters from each of the layers of syntax. The data in FIFO 190 is available through registers 150 for the host microcontroller to read. In general, this data is useful for controlling the decoder. The user data FIFO microcontroller is used to store data that follows the user data start code in the MPEG-½ bitstream. User data also is available to the host microcontroller 104 through a register.

Referring now to FIG. 8, the SPU decoder module 132 decodes SPU streams as defined in the DVD Specification For Read-Only Disc. As shown, the SPU decoder 132 preferably includes address generator and FIFO controller 200, SPU controller 208, PXD run length decoder 204, palette 206 and filter 214.

The address generator and FIFO controller 200 controls both the memory 114 buffer pointers and the on-chip FIFO pointers. Also included are two FIFOs (not specifically shown), the pixel data (PXD) FIFO and the command FIFO. The SPU controller 208 contains a state machine 202, SCR checker 210, and registers 212. The state machine 202 analyzes each SPU command and controls the entire SPU decoding schedule. The SCR checker 210 determines the command execution timing based on the system clock reference (SCR) counter. The pixel data run-length decoder 204 decodes the pixel data compressed by run-length encoding. The palette table 206 and various registers may be included in the PXD run-length decoder 204.

Referring now to FIG. 9, memory interface 138 preferably includes byte enable logic 220 and address converter 222. The memory interface 138 configures memory 114 into a 512×16-bit page size with a page break penalty of 6 to 7 cycles. The memory interface preferably also implements a column address strobe (CAS) latency of 3 and a burst length of 4. As shown in FIG. 9, the memory bus 122 preferably includes a 16-bit data bus, SBD[15:0], a 12-bit address bus, SBA[11:0], chip select signals, SCSn and SCSIn, and CAS and RAS signals, SCASn and SRASn. These signals are well known to those of ordinary skill in the art for effectuating communication with SDRAM devices. As shown, memory 114 includes at least one SDRAM device, but may include one or more additional SDRAM's as desired.

Many types of data may be stored in memory 114. In accordance with the preferred embodiment of the invention, OSD graphics data is stored in memory 114. Additionally, audio and video data may be stored in memory 114, as well as MPEG system header channel data, SPU channel data, and Navi Bank or private stream channel data.

Referring still to FIG. 9, in accordance with the preferred embodiment, the audio/video microcontroller 128 controls arbitration to memory 114. Memory arbitration is required because various devices and processes may concurrently require memory access. The memory arbitration algorithm gives higher priority to certain devices requesting memory access and lower priority to others. The arbitration priority preferably favors the MPEG video decoder 130 and channel interface 126. The next highest priority gives the display interface and SPU decoder 132. The next lowest priority is given the host interface 124, block data move transactions, and DMA data transfers. Lastly, memory refresh is given lowest priority. Other arbitration schemes can be implemented if desired.

Because the preferred memory configuration is 16 bits wide, the byte enable logic 220 in the memory interface 138 performs the conversion between the 16-bit memory bus 122 to the 64 bit internal bus of the audio/video decoder 120. The host microcontroller 104 and audio/video microcontroller 128 address memory 114 assuming an eight-byte wide data transfer configuration. The address converter 222 changes these addresses to suitable chip selects, bank selects, and column and row addresses for the memory 114.

Referring now to FIG. 10, the video interface 134 preferably includes a display control 230, an address generator 232, a vertical filter unit 234, a horizontal filter unit 236, an SPU 240, an OSD mixer 242, and a timing generator 244. The address generator 232, under control of the timing generator 244, addresses the video frames stored in memory 114 to read pixel data into the post-processing filters 234, 236, and 238. The address generator 232 also commands display control 230 and reads OSD bitmap data into the OSD mixer 242. The post-processing filters 234, 236, and 238 modify the pixel data based on instructions from the display control 230 to perform various video operations such as "letter boxing," "3:2 pulldown, "pan and scan," techniques generally known to those skilled in the art.

The display control 230 also sets the location of the video image on the display 90 (FIG. 2) with respect to sync signals (not shown) to account for the requirements of several different timing systems and display modes. The output signal from horizontal interpolation filter 238 is then processed by SPU mixer 240 which adds SPU data from the SPU decoder 132 to the video data stream from filter 238.

The OSD mixer 242 mixes together the processed video data from SPU mixer 240 with an OSD image retrieved from memory 114. The output data stream from OSD mixer 242 is then provided to NTSC/PAL encoder 116 (FIG. 3).

Referring now to FIGS. 3 and 12, upon system initialization the host microcontroller 104 preferably downloads OSD data sets stored in ROM 107 to memory 114 via the audio/video decoder 120. In accordance with the preferred embodiment, not every OSD data set includes a color palette in contrast to conventional video systems in which all OSD data sets include color palettes. The OSD data set 1 in Figure.12, for example, includes a color palette, but not OSD data sets 2 and 3. Accordingly, less memory capacity is needed to store all of the OSD data sets with the preferred format of FIG. 12, and consequently less bus bandwidth is required to transfer the OSD data sets over bus 105 and memory bus 122.

FIG. 11 shows the contents of a portion of an exemplary OSD data set 300, in accordance with the preferred embodiment. The data set shown in FIG. 11 includes a header 302, a color palette 304, and bitmap data 306. As described above, the audio/video decoder 120 includes a 64-bit data bus and thus can accommodate the simultaneous transfer of four 16-bit words of data to or from memory 114. These 16-bit words are labeled as SDRAM Word 0, SDRAM Word 1, SDRAM Word 2, and SDRAM Word 3.

The header 302 comprises four 16-bit words. The header includes two high color mode bits, H(1) and H(0), which are defined at Word 0, bit 15 (H(1)) and Word 1, bit 11 (H(0)). These two bits are used to set 2-, 4-, or 8-bit color mode according to Table 1 below.

TABLE I

High Color Mode Definition.

| H[1:0] | Description |
| --- | --- |
| 00 | 2 bits/pixel |
| 01 | 8 bits/pixel |
| 10 | 4 bits/pixel |
| 11 | Reserved |

The H[1:0] bits determine the size of each bitmap datum 306. That is, for the 2 bits per pixel mode, each bitmap datum 306 comprises only 2 bits. In the 4 bit per pixel color mode each bitmap datum 306 comprises a 4-bit value, whereas an 8 bit per pixel color mode requires each bitmap datum to comprise an 8-bit value. The exemplary OSD data set of FIG. 11 illustrates the 4-bit color mode. Thus, each of the bitmap values 306, represented individually as D0, D1, D2, etc. represent 4-bit values.

The size of each OSD image is defined preferably by the location on the screen of the pixels that are located in the upper left-most corner and the lower right-most corner of the OSD image. The upper location of the left-most pixel is specified by STARTR[8:0] and start column (STARTC[8:0]) values in the header 302. The location of the lower right-most pixel is specified by the end row (ENDR[8:0]) and end column (ENDC[8:0]). The two pixel addresses thus locate the opposite corners of a square or rectangular-shaped OSD. Once the location of these two corners is defined, the coordinates of the remaining pixels located within the OSD image area can easily be interpolated as one of ordinary skill in the art will recognize.

The audio/video decoder 120 can accommodate OSD data sets that are stored contiguously (i.e., back-to-back) in memory 114 or in non-contiguous memory locations. If the OSD data sets are stored in non-contiguous memory locations, the header of each OSD data set preferably includes the starting memory address of the next OSD data set. The address of the subsequent OSD display area is defined by the 19-bit OSD address, OSDA, included in header 302. The 19 bits comprising the OSDA value is distributed among all four SDRAM words comprising the header as shown in FIG. 11.

In accordance with the preferred embodiment, the header of each OSD data set includes a Bitmap Only bit (BMP ONLY). As shown in FIG. 11, the bitmap only bit is defined as bit 10 in Word 1. When cleared, this bit indicates that the associated OSD data set includes a color palette. When set, this bit indicates that the OSD data set does not include a color palette. Alternatively, the BMP ONLY bit could be implemented as a logic 1 to indicate the presence of a palette and a logic 0 to indicate the absence of a palette. The display control 230 of the video interface 134 (FIG. 10) decodes the BMP ONLY bit to determine whether the current OSD data set includes a color palette. If the display control 230 determines that no color palette is present with the current OSD data set, the display control 230 uses an existing color palette. Referring again to FIG. 12 as an example, the BMP ONLY bit in Header 1 would be a logic 0 to indicate that OSD 1 includes a color palette. The BMP ONLY bits in Header 2 and Header 3, however, would be set to a logic 1 to indicate that the OSD 2 and OSD 3 data sets do not include their own color palettes. Rather, the display control 230 will use the color palette associated with OSD 1 which was previously stored in the video interface 134 when OSD 1 was drawn on the screen.

Alternatively, a default color palette could be used if the BMP ONLY bit of an OSD data set indicates that no color palette has been included in the data set. This default palette can be stored in memory (not specifically shown) in the video interface.

The bitmap data 306 determines which color from the color palette is to be applied to the pixels in the OSD image. Thus, there is one bitmap data value for each pixel in the OSD image. In the exemplary OSD data set of FIG. 11, the color palette 304 includes 16 different colors and thus each bitmap datum is a four bit value that specifies which of the 16 color palette colors is to be applied to the pixel corresponding to that bitmap datum. In accordance with the preferred embodiment, data value D0 corresponds to the pixel in the upper, left most corner of the OSD image. Value D1 corresponds to the pixel immediately to the right of the pixel associated with D0. Accordingly, the OSD mixes 242 (FIG. 10) uses the bitmap data 306 to determine which color from the color palette 304 to mix in with the video data when drawing each pixel in the OSD image area.

Each color palette color preferably comprises a 16-bit number in accordance with the YCbCr industry standard. Six bits are used to represent luminance (Y) and eight bits are used to represent the chrominance components (four bits each for Cb and Cr). One bit is reserved and another bit is a "mix enable" bit which enables or disables mixing of video and OSD. The decoder 120 preferably multiplies the Y luminance value by four and the Cb and Cr chrominance values by 16 before using the numbers to render the OSD on the display. Thus, although the color palette includes 14 bit color numbers (omitting the reserved and mix enable bits), the YCbCr value that is used by OSD mixer 242 preferably is a 24-bit number.

Thus, the embodiment described above illustrates an improved format for representing OSD images. As described, not all OSD images are represented by a data set that includes a color palette. Consequently, the total amount of OSD data can be reduced as compared to previous systems, thus advantageously permitting a smaller memory capacity to store OSD images and a smaller bus bandwidth to transfer the data within the video system.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A video system for processing video data and on-screen display (OSD) data sets to be provided to a display device, comprising:

a video processing unit; and a memory device coupled to said video processing unit in which OSD data sets can be stored;

wherein each OSD data set includes a control bit configurable to indicate whether the data set includes a color palette, otherwise said control bit indicates that a color palette that is not part of said OSD data set is used from which to select colors to render an OSD image.

2. The video system of claim 1 wherein each OSD data set includes a header and said control bit is included in said header.

3. The video system of claim 2 wherein said bitmap data immediately follows said header if said control bit is configured to indicate that the OSD set does not include said color palette.

4. The video system of claim 1 wherein said video processing unit reads said control bit for each OSD data set to determine whether each data set includes said color palette.

5. A video system for processing video data and on-screen display (OSD) data sets to be provided to a display device, comprising:

a video processing unit; and a memory device coupled to said video processing unit in which OSD data sets can be stored;

wherein each OSD data set includes a control bit configurable to indicate whether the data set includes a color palette, otherwise said control bit indicates that a color palette that is not part of the OSD data set is used from which to select colors to render an OSD image, and said video processing unit reads said control bit for each OSD data set to determine whether each data set includes a color palette; and said video processing unit uses a color palette stored in said video processing unit if said control bit indicates the absence of a color palette as part of the OSD data set.

6. The video system of claim 5 wherein said color palette that is used if an OSD data set omits a color palette comprises a color palette included as part of another OSD data set.

7. The video system of claim 5 wherein said color palette that is used if an OSD data set omits a color palette comprises a default color palette stored in said video processing unit.

8. The video system of claim 5 wherein said video processing unit includes an OSD mixer for mixing OSD data with video data.

9. A video system for processing video data and on-screen display (OSD) data sets to be provided to a display device, comprising:

a video processing unit; and a memory device coupled to said video processing unit in which OSD data sets can be stored;

wherein each OSD data set includes a control bit configurable to indicate whether the data set includes a color palette, otherwise said control bit indicates that a color palette that is not part of said OSD data set is used from which to select colors to render an OSD image; and wherein, if included in said OSD data sets, said color palette comprises color values represented by 14-bit numbers.

10. A video processor, comprising;

a memory interface for coupling to a memory device and writing and reading video and OSD data to and from said memory device;

a host interface for coupling to a host microcontroller; and a video interface coupled to said host and memory interfaces over a bus;

wherein said video interface receives OSD data sets used to draw OSD images from said memory device and interprets a control bit included in each OSD data set to indicate whether the data set includes a color palette, otherwise said control bit indicates a color palette that is not part of said OSD data set is used from which to select colors to draw an OSD image.

11. A video processor, comprising;

a memory interface for coupling to a memory device and writing and reading video and OSD data to and from said memory device;

a host interface for coupling to a host microcontroller; and a video interface coupled to said host and memory interfaces over a bus;

wherein said video interface receives OSD data sets used to draw OSD images from said memory device and interprets a BITMAP ONLY bit included in each OSD data set to indicate whether the data set includes a color palette, otherwise said control bit indicates that a color palette that is not part of said OSD data set is used from which to select colors to render an OSD image and said video interface interprets said BITMAP ONLY bit.

12. The video processor of claim 11 wherein if said video interface interprets said BITMAP ONLY bit as indicating that said OSD data set does not include a color palette, said video interfaces uses a color palette associated with a different OSD data set to draw the OSD image.

13. The video processor of claim 11 wherein if said video interface interprets said BITMAP ONLY bit as indicating that said OSD data set does not include a color palette, said video interfaces uses a default color palette stored in said video interface to draw the OSD image.

14. The video processor of claim 11 wherein said video interface includes an OSD mixer for mixing video data retrieved from said memory device and processed by said video interface with OSD data retrieved from said memory device.

15. A method for processing OSD images in a video system wherein all of said OSD images are represented by data sets that include a header and bitmap data, and some, but not all, of said OSD images are represented by data sets that include a color palette, comprising;

reading said header; and decoding a control bit in said header that indicates whether the corresponding OSD data set includes a color palette, otherwise said control bit indicates that a color palette that is not part of said data set is used from which to select colors to render an OSD image.

16. A method for processing OSD images in a video system wherein all of said OSD images are represented by data sets that include a header and bitmap data, and some, but not all, of said OSD images are represented by data sets that include a color palette, comprising:

reading said header;

decoding a control bit in said header that indicates whether the corresponding OSD data set includes a color palette, otherwise said control bit indicates that a color palette that is not part of said OSD data set is used from which to select colors to render an OSD image; and further including drawing an OSD image using a color palette included with another OSD data set if said control bit indicates said OSD data set does not include a color palette.

17. A method for processing OSD images in a video system wherein all of said OSD images are represented by data sets that include a header and bitmap data, and some, but not all, of said OSD images are represented by data sets that include a color palette, comprising:

reading said header;

decoding a control bit in said header that indicates whether the corresponding OSD data set includes a color palette, otherwise said control bit indicates that a color palette that is not part said OSD data set is used from which to select colors to render an OSD image; and further including drawing an OSD image using a default color palette if said control bit indicates said OSD data set does not include a color palette.

18. A method for processing OSD images in a video system wherein all of said OSD images are represented by data sets that include a header and bitmap data, and some, but not all, of said OSD images are represented by data sets that include a color palette, comprising:

reading said header;

decoding a control bit in said header that indicates whether the corresponding OSD data set includes a color palette, otherwise said control bit indicates that a color palette that is not part said OSD data set is used from which to select colors to render an OSD image; and wherein said decoding step includes determining whether said control bit is set to indicate that the OSD data set does not include a color palette or cleared to indicate that the OSD data includes a color palette.

19. A DVD video and audio system, comprising:

a host microcontroller for controlling said DVD video and audio system;

a memory device coupled to said host microcontroller for storing OSD data sets and video and audio data;

an audio/video decoder coupled to said memory device and said host microcontroller, including:

a memory interface;

a decoder microcontroller coupled to said memory interface;

a video interface coupled to said memory interface and said decoder microcontroller for processing OSD data sets retrieved from memory;

wherein each OSD data set includes a BITMAP ONLY bit configurable to indicate whether the data set includes a color palette, otherwise said control bit indicates that a color palette that is not part of said OSD data set is used from which to select colors to render an OSD image and said video interface decodes said BITMAP ONLY bit.

* * * * *